June 17, 1941.   H. ADENSTEDT ET AL   2,246,161
SELENIUM CELLS AND METHOD OF PRODUCING THE SAME
Filed June 5, 1939
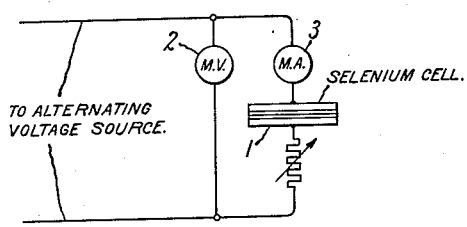
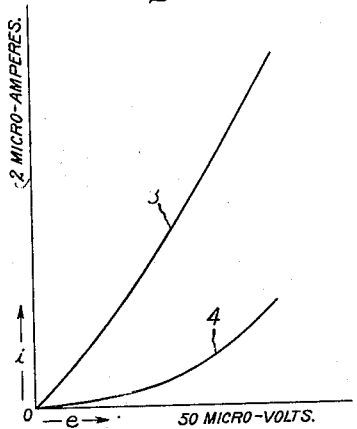
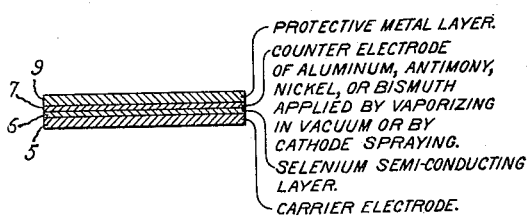
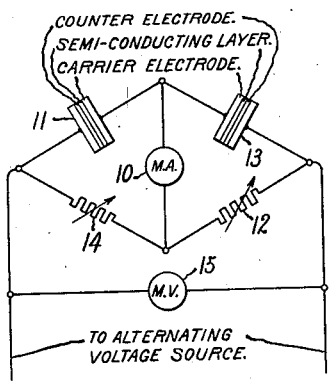
Inventors:
Heinrich Adenstedt,
Heinz Wittke,
by Harry E. Dunham
Their Attorney.

Patented June 17, 1941

2,246,161

UNITED STATES PATENT OFFICE 2,246,161

SELENIUM CELLS AND METHOD OF PRODUCING THE SAME

Heinrich Adenstedt, Berlin-Reinickendorf, and Heinz Wittke, Hohen Neuendorf, near Berlin, Germany, assignors to General Electric Company, a corporation of New York Application June 5, 1939, Serial No. 277,502
In Germany June 14, 1938

2 Claims. (Cl. 175—366)

Our invention relates to selenium cells, particularly to a process for producing selenium cells for rectifiers or the like and its object is to produce such cells which are capable of efficient operation at alternating voltages of very low value. Rectifiers produced in accordance with the present invention and used with known direct current instruments are suitable for the measuring of the smallest alternating voltages and currents which, up to the present time, by reason of their small values could not be measured by means of usual indicating instruments.

To accomplish this object we form the counterelectrode of the selenium rectifier cell of such material and deposit it upon the semi-conducting layer in such manner that the internal resistance of the cell at low alternating voltages is materially decreased.

The novel features which are considered to be characteristic of our invention are set forth with particularity in the appended claims. Our invention itself, however, both as to its organization and method of operation together with further objects and advantages thereof may best be understood by reference to the following description taken in connection with the accompanying drawing wherein Fig. 1 is a circuit diagram for small voltage and current measurements in connection with rectifiers of the selenium type, Fig. 2 shows curves illustrating comparative measurements made in accordance with the circuit of Fig. 1, Fig. 3 illustrates a selenium rectifier cell having a counterelectrode formed in accordance with our invention, and Fig. 4 illustrates a full wave circuit, for small voltage and current measurements, employing selenium rectifiers constructed in accordance with our invention.

In Fig. 1 the circuit is so arranged that small voltages may be impressed on a selenium type rectifier 1 from a suitable alternating voltage source, the voltage values being indicated by a voltmeter 2 and the values of the corresponding current passing through the rectifier being indicated by an ammeter 3. It is well known that if a conventional selenium rectifier is tested in a circuit in accordance with Fig. 1, the results for small alternating voltages are as indicated in curve 4 of Fig. 2. From this curve it is readily seen that the internal resistance of the conventional selenium rectifier at the very small voltages is too high. Moreover, the characteristic 1 is too strongly curved.

We have found that the internal resistance of selenium rectifiers at very small alternating voltages, and also the undue curving of the characteristic, are considerably reduced when, in the selenium cell illustrated in Fig. 3 comprising carrier electrode 5 and semi-conducting selenium layer 6, the counterelectrode 7 is vaporized on to the semi-conducting layer 6 in a high vacuum or is applied by the cathode spraying or sputtering process. For the purpose of forming the counterelectrode 7, metals of the group comprising aluminum, antimony, nickel, and bismuth have proved suitable.

Upon testing a selenium cell having the counterelectrode 7 formed in accordance with the present invention, it is found that the internal resistance of the cell is materially reduced and that a characteristic is obtained which is much less curved. For example, by forming the counterelectrode 7 as above described, a selenium cell is obtained having a characteristic as shown by curve 8 of Fig. 2.

It is of advantage, after the application of the vaporized or sprayed metal to form the counterelectrode 7, to heat treat the entire rectifier at a temperature of approximately 150 degrees centigrade. The position and form of the characteristic 8 may be changed by suitably selecting the temperature at which the cell is treated and the time period of the treatment. As a protective layer for the counterelectrode 7 a further metal layer 9 may be applied to the counterelectrode.

In the example shown in Fig. 4 of a circuit comprising selenium rectifiers constructed in accordance with the present invention, one of the half waves of the alternating voltage from the voltage source is impressed on the direct current measuring instrument 10 through the rectifier 11 and the resistance 12, and the other half wave is impressed on the instrument 10 through the rectifier 13 and the resistance 14, the ammeter 15 indicating the value of the alternating voltage impressed on the rectifiers.

Our invention has been described herein in particular embodiments for purposes of illustration. It is to be understood, however, that the invention is susceptible of various changes and modifications and that by the appended claims we intend to cover any such modifications as fall within the true spirit and scope of our invention.

What we claim as new and desire to secure by Letters Patent of the United States is:

1. The method of producing a dry plate element having a selenium semi-conducting layer, which includes applying a counterelectrode to said layer by exposing said layer in a vacuum to the vapor of a metal of the group comprising aluminum, antimony, nickel and bismuth, and subsequently heat treating said element at a temperature of approximately one hundred fifty degrees centigrade.

2. The method of producing a dry plate element having a selenium semi-conducting layer, which includes applying a counterelectrode to said layer by cathode spraying upon said layer a layer of metals of the group comprising aluminum, antimony, nickel, and bismuth, and subsequently heat treating said element at a temperature of one hundred fifty degrees centigrade.

HEINRICH ADENSTEDT.
HEINZ WITTKE.